Nov. 16, 1954     H. C. ROSENGART     2,694,291
ROTOR AND COMBUSTION CHAMBER ARRANGEMENT FOR GAS TURBINES
Filed July 22, 1948     3 Sheets-Sheet 1
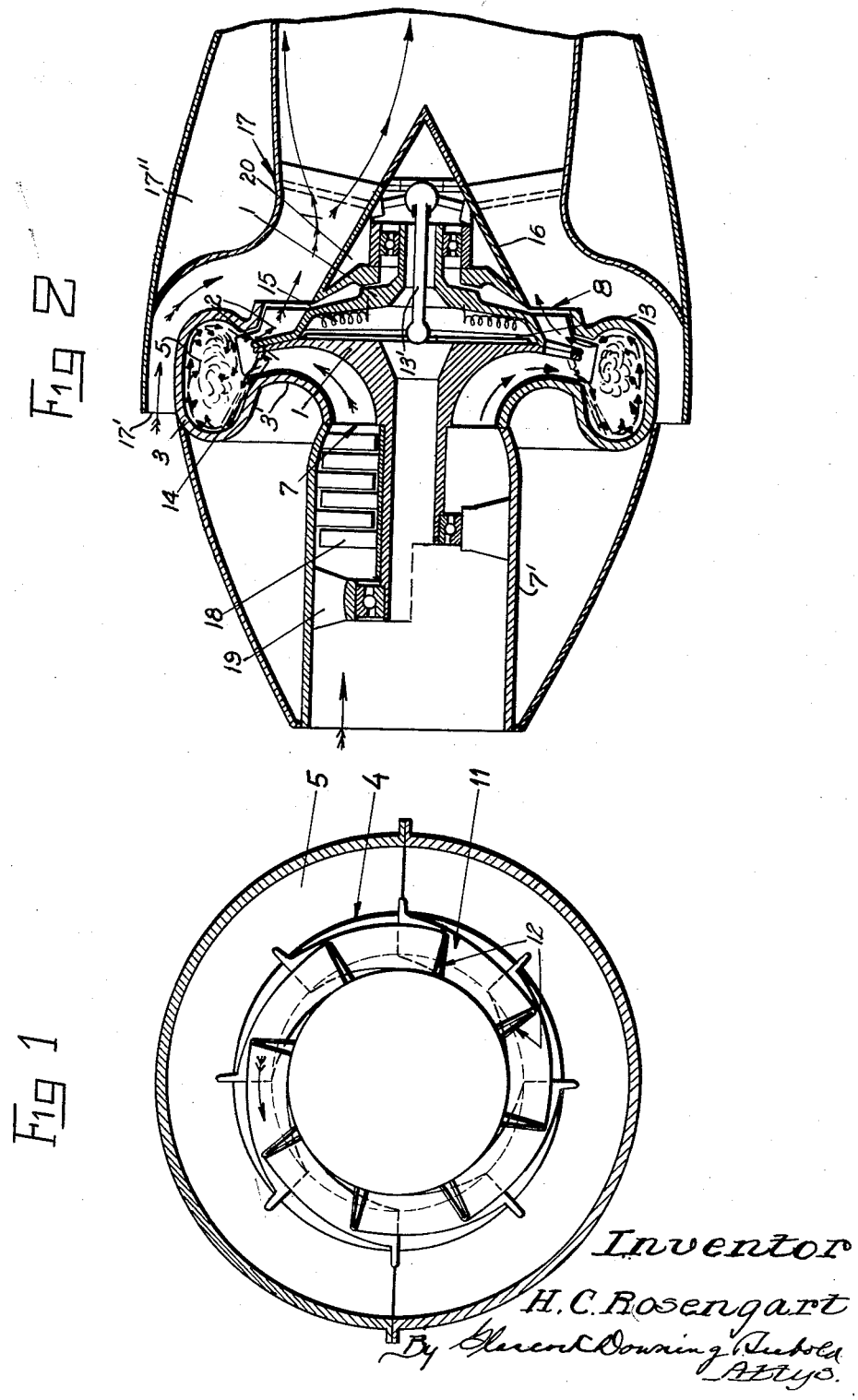

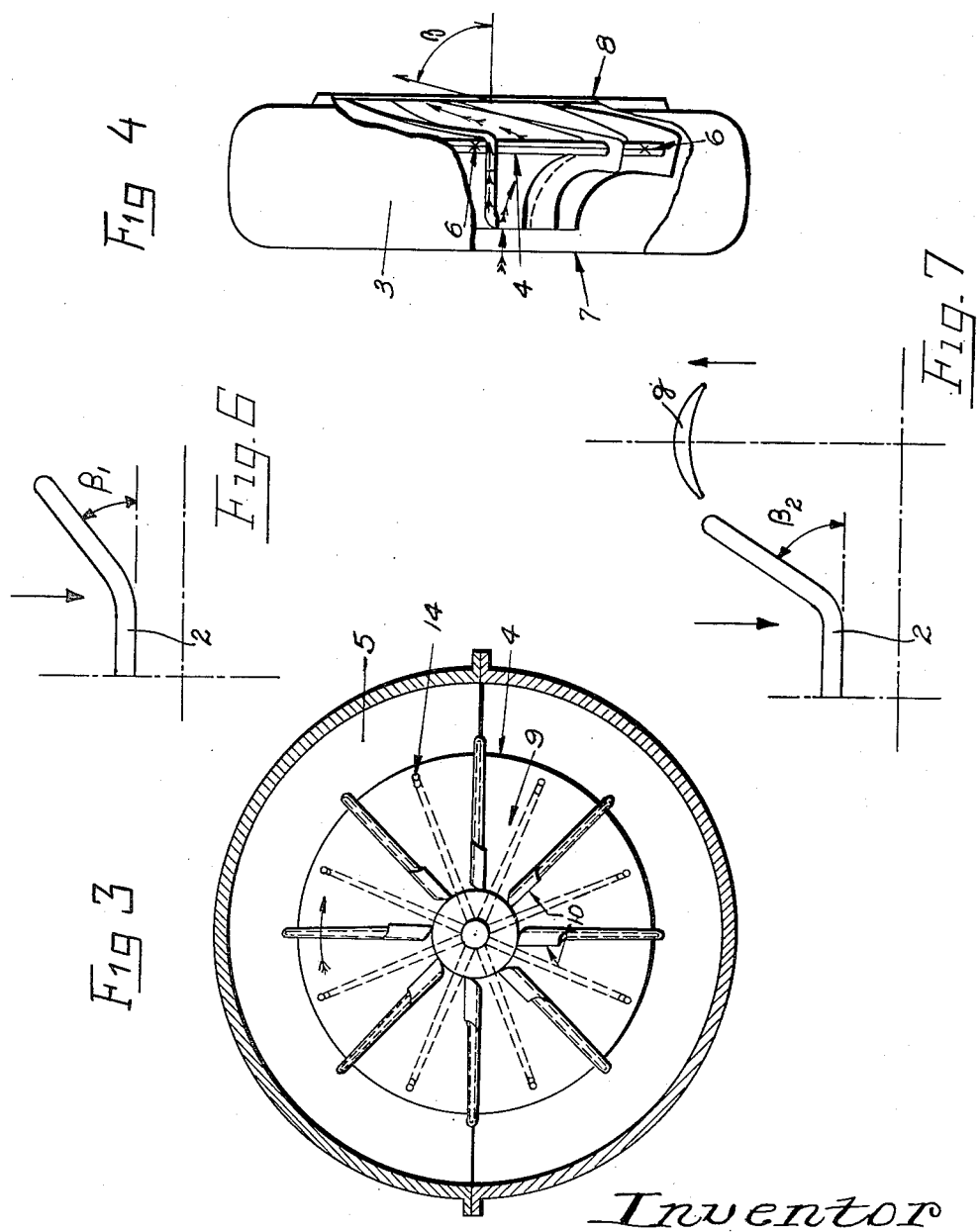

Nov. 16, 1954     H. C. ROSENGART     2,694,291
ROTOR AND COMBUSTION CHAMBER ARRANGEMENT FOR GAS TURBINES
Filed July 22, 1948     3 Sheets-Sheet 3
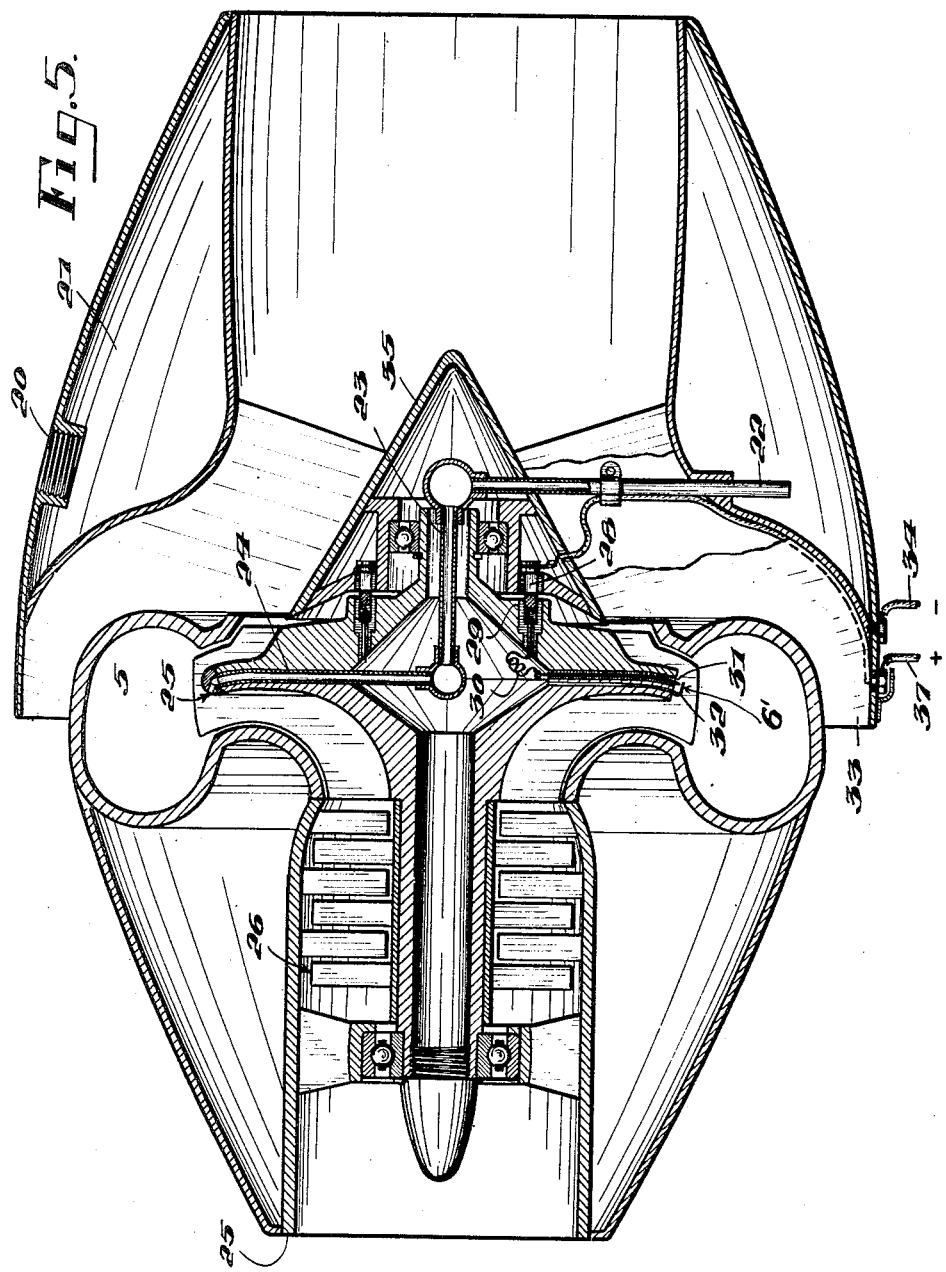

United States Patent Office 2,694,291
Patented Nov. 16, 1954

2,694,291

ROTOR AND COMBUSTION CHAMBER ARRANGEMENT FOR GAS TURBINES

Henning C. Rosengart, Trollhattan, Sweden

Application July 22, 1948, Serial No. 40,050

Claims priority, application Sweden February 7, 1948

5 Claims. (Cl. 60—39.36)

This invention broadly relates to the art of prime movers.

More particularly, the present invention relates to an improvement in a power plant of a combustion gas turbine type utilized as a reaction engine for propelling aircraft or for other suitable driving purposes. As an example, the improved gas turbine arrangement can be utilized to impart power to the blade system of a turbine to be driven.

Accordingly, it is an object of the present invention to provide an improved combustion gas turbine in which the combustion chamber and rotor, including its blades, are of reduced axial extent and the blade system is hollow so that the air and exhaust gases pass between the blades while cooling air passes within the hollows of the blades to facilitate cooling.

It is an additional object to provide in such a combustion gas turbine arrangement, a fuel jet arrangement including jets positioned peripherally of the rotor intermediate the blades and so directed into the combustion chamber as to spray fuel within the chamber tangentially thereof.

A further object is to provide the hollow blades of inverted V-shaped configuration in cross section with the exhaust gas outlet blades curved helically with respect to the rotor axis.

Further and more specific objects will be apparent from the following description taken in connection with the accompanying drawings illustrating the invention as embodied in a power plant including a stationarily supported combustion chamber of general toroidal shape having a continuous opening in its inner periphery and within which chamber is a rotor that is of such width as to have its periphery rotating within the opening and in which the outlet side of the combustion chamber communicates with an ejector formed in the stationary housing.

In the drawings, Figure 1 is an axial view with parts removed and looking toward the combustion chamber from the outlet end of the turbine, particularly illustrating the exhaust gas directing portions of the blades, Figure 2 is an axial sectional view of the turbine, Figure 3 is an end view similar to Figure 1 but taken axially from the inlet end of the turbine, Figure 4 is a diagrammatic side view, partly broken away, illustrating the blades and the channels therebetween, Figure 5 is a view similar to Figure 2 but particularly illustrating the fuel feed and spark ignition arrangement, and Figures 6 and 7 diagrammatically illustrate the angle between the exhaust directing portion of a turbine blade and a plane parallel to the rotor shaft when the turbine is to be utilized as a reaction propulsion unit and a turbine means for another turbine respectively.

In the drawings, Figures 1–4, the turbine includes a stationary combustion chamber denoted generally at 3. This combustion chamber is generally toroidal shaped and has a continuous opening at its inner periphery. The wall means that define this combustion chamber include front and rear portions radially outward of the opening and which portions are outwardly curved and face one another. The front wall portion includes an extension 3' that is curved inwardly and laterally forwardly of one edge of the opening. The rear wall portion includes a surface that is sloped inwardly and laterally rearwardly at an acute angle to the axis of the turbine at the rear edge of the opening. A rotor denoted generally at 1 rotates within the said wall means and has its contour generally simulating the contour of the inwardly and forwardly curved extension of the front wall portion of the combustion chamber and also the rear wall portion surface of the combustion chamber. Mounted on this rotor are hollow blades 2. These blades are of inverted V-shaped cross section as is indicated Figure 1, and they have such dimensions as to fit with close clearance relative to the inwardly and forwardly curved front wall portion extension and also the rearwardly sloping rear wall portion surface, and this is believed clear in the showing in Figure 2. Thus between each blade there is provided an air inlet passage extending from the end 7 of the rotor into the annular space 5 of the combustion chamber and an exhaust gas passage between the blades extending from out of the said annular space rearwardly of the rear end 8 of the wall means defining the combustion chamber. Within each blade is formed channels having an inlet port as shown at 10 in Figure 3, and outlet ports denoted at 12 in Figure 1. The exhaust gas directing portions of the blades 2 are curved helically with respect to the rotor axis and at their outer surfaces, as shown in Figure 2, are sloped inwardly and rearwardly in close clearance with the adjacent surface of the rear wall portion of the combustion chamber wall means.

It is believed clear, that the combustion chamber as shown, in cross section, in Figure 2, has rounded ends, the centers of curvature of which are spaced outwardly from the periphery of the rotor and are on a line parallel to the axis of the turbine. Due to this configuration and the arrangement of the rotor and its blades, the rotor effects an air current around the centers of curvature and which current terminates in a whirl having its center in a plane of the rotor.

Fuel is supplied to the combustion chamber through jets 14 positioned peripherally of the rotor intermediate the blades, Figure 3. These jets are so directed into the combustion chamber as to spray fuel therewithin tangentially thereof, Figures 1 and 5. Fuel is led to the jets through radial fuel channels 13 fed from a central fuel channel 13' that is arranged axially of the rotor. The fuel feed arrangement will be described hereinafter with more detail with reference to Figure 5. It is believed clear that centrifugal force imparted by rotation of the rotor will draw fuel through the channels and feed it through the jets 14.

At the inlet end 7 of the rotor 1 through which the air will enter to flow to the combustion chamber, the plane of each of the blades 2 is parallel with the axis of the rotor. This arrangement extends up to and within the combustion chamber and then the blades are bent sidewise, that is more or less curved helically so that at the exit end 8 of the rotor through which exhaust gases pass, the blades are at a certain angle B as shown in Figure 4.

The rotor shaft is extended at the inlet end and carries blades that cooperate with blades projecting inwardly of the air induction tube 7, to provide a turbo compressor denoted generally at 18. The rotor shaft is journalled in bearings on suitable radially disposed supports 19. A conical flow directing element 16 is fixedly mounted on radial supports 20 with its base adjacent the exhaust gas outlet section of the rotor. The turbine is completed by an ejector casing 17 extending rearwardly across the chamber including a cooling air conduit 17'. This casing is hollow at 17" and this hollow portion forms a fuel reservoir with fuel conduits, extending from the reservoir to and communicating with the central fuel conduit 13'.

The operation of the turbine will be described with reference to the detailed showing in Figure 5. Fuel is supplied to the turbine from a fuel pump, not shown, through the aperture 20 in the reservoir 21. Through the conduit 22, the fuel is conducted to a central fuel pipe 23 from which it is distributed through pipes 24 to the jet nozzles 25 from which it is discharged tangentially into the combustion chamber 5' as shown by the arrow. To start the turbine, a conventional compressed air starting system, not shown, including an air outlet nozzle fed by a blower, is arranged with the nozzle pressed against the air induction tube 25 so that air under pressure will flow into this tube to drive the compressor denoted generally at 26. The air is compressed and flows through the channels formed between the blades 2' into the combustion chamber where it is ignited. The ignition system includes a source of current, not shown, which includes a voltage transformer which can be of any convenient type, and further, an electric cable 27 leading current to a current conducting body 28 which is insulated from the turbine. In the rotor body, that is the back plate thereof, is arranged another current conducting body 29 which is axially displaceable and spring pressed into contact with the current conducting body 28 so that current can be transferred through a cable 30 to the part 31 of the spark plug denoted generally at 6'. The other part of the plug 32 is electrically connected to the rotor which by way of the bearings is connected to the outer housing surrounding thhe combustion chamber and then through the radial supports 33 and back through cable 34 to the transformer and source. To facilitate rapid ignition, there are plural plugs mounted in the rotor. The plugs are effective only until the ignition and combustion are commenced, whereupon the electrical circuit is broken.

After the ignition has occurred in the combustion chamber, the combustion gases discharged through the outlet end of the rotor, due to the shape of the combustion case directing portion of the blades 2 and 2', will effect rotation of the compressor 18 or 26 following which the starting nozzle is removed.

The regulation of the fuel supply will be effected automatically. The fuel pump, not shown, is adjusted to deliver a certain rate of fuel per time unit and at a certain speed of the rotor the radial channel 24 extending between the central channel 23 and the nozzles 25, is completely filled with fuel. If for any reason, for instance reduced load on the rotor, the speed of the same increases, the fuel supply to the combustion chamber will also increase, so that the length of the fuel column in the radial channels is reduced correspondingly. This increase of fuel supply will occur only during a very short period as the pressure of the fuel at the nozzle 14 will be immediately reduced as the fuel quantity in the radial channels has been reduced. It is to be pointed out that the pump will deliver a constant fuel quantity which will be supplied to the jets or nozzles in accordance with the load on the rotor and the peripheral speed of these nozzles.

With the ignition of the fuel, the burnt gases that exhaust from the combustion chamber tthrough the outlet end 8 of the rotor and due to the expansion of these gases will effect the power development in the outlet channel. By the angle B which these channels bear to their axial level, a power component will arise in the peripheral direction which acts on the rotor to drive the same and thus the compressor. Due to this rotational effect of the exhaust gases, there will arise a turbulent motion which is utilized in the ejector 17 since a considerable pressure drop will occur in the middle of the ejector, whereby the speed and quantity of the cooling air drawn in will be highly increased.

A conical flow directing element 16, Figure 2, and 35, Figure 5, will direct the gases backwards. This is particularly in instances where the turbine is to be used as a reaction engine, in which event as shown diagrammatically in Figure 6, the angle $B_1$ between a blade 2 of the outlet end of the rotor and a plane parallel to the rotor shaft will be reduced.

If it is desirable to mount a turbine on the rotor shaft so that the exhaust gases will drive the same, the angle of the blades is altered so that as shown diagrammatically in Figure 7, the angle $B_2$ between blade 2 and a plane parallel to the rotor shaft is larger than is the case in Figure 6 so as to obtain a direction of gas flow which is suitable to actuate a turbine, one of whose blades is denoted diagrammatically at Q. In this instance, the combustion gases must be used to actuate this turbine and the latter will rotate in a direction opposite to the rotation of the rotor.

It is also to be pointed out that the inverted V-shaped hollow blades on the rotor are continuous and include straight line sections extending across the inner portion of the combustion chamber. Since rotor blades are subjected to high temperatures and considerable stress due to the action of centrifugal force, the fact that they are hollow provides for proper cooling thereof since some of the air drawn in by the rotor blades passes within the blades, although the larger quantity thereof passes between the blades. This air that passes within the blades has a cooling action thereon. It is true that it will become heated in its passage, but due to this heat it will expand and consequently have a certain reaction effect on the rotor when it leaves the discharge end of the hollow blades.

It is also clear that the fuel particles reach the wall of the combustion chamber at a velocity which is equal to the peripheral velocity of the rotor. This enhances rapid vaporization and complete combustion of the fuel. Due to the construction and arrangement of parts, the gaseous mixture will flow relative to the wall of the combustion chamber at the same peripheral velocity as that of the rotor and hence the fuel particles must, as they are ejected from the nozzles on the periphery of the rotor have the same velocity.

It is further believed clear that the compact constructional arrangement provides a combustion gas turbine of reduced axial dimensions.

While the drawing and descriptions relate to the particular embodiment shown, it is understood that this invention is not to be limited other than by the spirit and scope of the appended claims.

What is claimed is:

1. A gas turbine including wall means defining a combustion chamber of generally toroidal shape, said chamber having a continuous opening in its inner periphery, said wall means in cross section including front and rear curved portions radially outward of the opening and facing one another, said front portion including an extension curved inwardly of the opening and laterally forwardly of the front edge of the opening, said rear portion of the wall means including a surface extending inwardly of the opening and sloping laterally rearwardly at an acute angle to the axis of the turbine at the rear edge of the opening, a rotor within the turbine and having its contour generally simulating that of the inwardly and forwardly curved extension and the rearwardly sloping rear wall portion surface inverted, V-shaped hollow air inlet blades on said rotor having close clearance with the inwardly and forwardly curved front wall extension and terminating within the combustion chamber, fuel jets positioned peripherally on the rotor intermediate said blades and so directed inwardly of the combustion chamber as to spray fuel within the combustion chamber tangentially thereof, and inverted V-shaped hollow exhaust gas outlet blades on said rotor respectively in communication with the inverted V-shaped hollow air inlet blades and curved helically with respect to the rotor axis and sloped inwardly and rearwardly in close clearance with the inwardly and rearwardly sloped rear wall portion surface.

2. A gas turbine including wall means defining a combustion chamber of generally toroidal shape, said chamber having a continuous opening in its inner periphery, said wall means in cross section including front and rear curved portions radially outward of the opening and facing one another, said front portion including an extension curved inwardly of the opening and laterally forwardly of the front edge of the opening, said rear portion of the wall means including a surface extending inwardly of the opening and sloping laterally rearwardly at an acute angle to the axis of the turbine at the rear edge of the opening, a rotor within the turbine and having its contour generally simulating that of the inwardly and forwardly curved extension and the rearwardly sloping rear wall portion surface, said rotor having its periphery within the opening of the combustion chamber, inverted V-shaped hollow air inlet blades on said rotor having close clearance with the inwardly and forwardly curved front wall extension and terminating in straight line sections across the inner portion of the combustion chamber, fuel jets positioned peripherally on the rotor intermediate said blades and so directed into the combustion chamber as to spray fuel within the combustion chamber tangentially thereof, and inverted V-shaped hollow air inlet blades at the straight line sections of the latter and curved helically with respect to the rotor axis and sloped inwardly and rearwardly in close clearance with the inwardly and rearwardly sloped rear wall portion surface.

3. A gas turbine including wall means defining a combustion chamber of generally toroidal shape, said chamber having a continuous opening in its inner periphery, said wall means in cross section including front and rear curved portions radially outward of the opening and facing one another, said front portion including an extension curved inwardly of and laterally forwardly of the front edge of the opening, a rotor within the turbine and having its contour generally simulating that of the inwardly and forwardly curved front wall portion extension, a conical flow directing element having its base adjacent the rotor, said rear portion of the wall means including a surface extending inwardly of the opening and sloping laterally rearwardly of the rear edge of the opening and said surface extending in the same general direction as the slant height of the conical flow directing element, inverted V-shaped hollow air inlet blades on said rotor having close clearance with the inwardly and forwardly curved front wall portion and terminating within the combustion chamber, fuel jets positioned peripherally on the rotor intermediate said blades so directed into the combustion chamber as to spray fuel within the combustion chamber tangentially thereof, and inverted V-shaped hollow exhaust gas outlet blades on said rotor respectively in communication with the inverted V-shaped hollow air inlet blades and curved helically with respect to the rotor axis and sloped inwardly and rearwardly in close clearance at their tops with the inwardly and rearwardly sloped rear wall portion surface and in substantial alignment with the slant height extension of the flow directing element.

4. A gas turbine including wall means defining a combustion chamber of generally toroidal shape, said chamber having a continuous opening in its inner periphery; said wall means in cross section including front and read curved portions radially outward of the opening and facing one another, said front portion including an extension curved inwardly of the opening and laterally forwardly of the front edge of the opening, said rear portion of the wall means including a surface extending inwardly of the opening and sloping laterally rearwardly at an acute angle to the axis of the turbine at the rear edge of the opening, a rotor within the turbine and having its contour generally simulating that of the inwardly and forwardly curved extension and the rearwardly sloping wall portion surface, inverted V-shaped hollow air inlet blades on said rotor having close clearance with the inwardly and forwardly curved front wall extension and terminating within the combustion chamber, fuel jets positioned peripherally on the rotor intermediate said blades so directed into the combustion chamber as to spray fuel within the combustion chamber tangentially thereof, means for supplying fuel to the combustion chamber through said jets including a central fuel channel in the rotor and radially disposed channels in the rotor connecting the central fuel channel and the jets, and inverted V-shaped hollow exhaust gas outlet blades on said rotor respectively in communication with the inverted V-shaped hollow air inlet blades and curved helically with respect to the rotor axis and sloped inwardly and rearwardly in close clearance with the inwardly and rearwardly sloped rear wall portion surface section.

5. A gas turbine including wall means defining a combustion chamber of generally toroidal shape, said chamber having a continuous opening at its inner periphery, said wall means in cross section including front and rear curved portions radially outward of the opening and facing one another, said front portion including an extension curved inwardly of and laterally forwardly of the front edge of the opening, a rotor within the turbine comprised by abutting air inlet and exhaust gas outlet sections, said air inlet section having its contour generally simulating that of the inwardly and forwardly curved front wall portion extension, a conical flow directing element having its base adjacent the exhaust gas outlet section of the rotor, said rear portion of the wall portion being sloped inwardly and rearwardly on the opposite side of the opening of the combustion chamber and extending in the same general direction as the slant height of the conical flow control element, and said exhaust gas outlet section of the rotor being sloped inwardly and rearwardly in substantial alignment with the slant height of the conical flow directing element, inverted V-shaped hollow air inlet blades on said air inlet section of the rotor having close clearance with the inwardly and forwardly curved front wall extension and terminating within the combustion chamber, fuel jets positioned peripherally on the rotor intermediate said blades so directed into the combustion chamber as to spray fuel within the combustion chamber tangentially thereof, and inverted V-shaped hollow exhaust gas outlet blades on said exhaust gas outlet section of the rotor in communication with the inverted V-shaped hollow air inlet blades and curved helically with respect to the rotor axis and sloped inwardly and rearwardly in close clearance at their tops with the inwardly and rearwardly sloped rear wall portion surface.

References Cited in the file of this patent

UNITED STATES PATENTS

| Number | Name | Date |
|---|---|---|
| 1,533,533 | Wirrer | Apr. 14, 1925 |
| 1,938,688 | Brooke | Dec. 12, 1933 |
| 2,256,198 | Hahn | Sept. 16, 1941 |
| 2,272,676 | Leduc | Feb. 10, 1942 |
| 2,283,176 | Birmann | May 19, 1942 |
| 2,409,446 | Pavlecka et al. | Oct. 15, 1946 |
| 2,416,389 | Heppner et al. | Feb. 25, 1947 |
| 2,514,874 | Kollsman | July 11, 1950 |
| 2,577,179 | Büchi | Dec. 4, 1951 |

FOREIGN PATENTS

| Number | Country | Date |
|---|---|---|
| 19,920 | Great Britain | Oct. 5, 1901 |